United States Patent [19]

Sanchez et al.

[11] Patent Number: 4,907,656
[45] Date of Patent: Mar. 13, 1990

[54] METHOD FOR PREVENTING STEAM CHANNELLING INTO A NON-AQUIFER BOTTOM WATER ZONE

[75] Inventors: J. Michael Sanchez; E. Thomas Strom, both of Dallas, Tex.; Paul Shu, Princeton Junction, N.J.; Bassem R. Alameddine, Carrollton, Tex.

[73] Assignee: Mobil Oil Corporation, New York, N.Y.

[21] Appl. No.: 292,129

[22] Filed: Dec. 30, 1988

[51] Int. Cl.⁴ .................. E21B 33/138; E21B 43/24
[52] U.S. Cl. .................. 166/270; 166/272; 166/273; 166/274; 166/288; 166/295; 166/302
[58] Field of Search .............. 166/270, 272, 273, 274, 166/288, 294, 295, 300, 302, 303; 523/130

[56] References Cited

U.S. PATENT DOCUMENTS

| | | | |
|---|---|---|---|
| 2,799,341 | 7/1957 | Maly | 166/295 X |
| 3,557,562 | 1/1971 | McLaughlin, Jr. et al. | 166/295 |
| 3,601,195 | 8/1971 | Hearn | 166/288 |
| 3,918,521 | 11/1975 | Snavely, Jr. et al. | 166/272 |
| 3,997,004 | 12/1976 | Wu | 166/272 X |
| 4,157,322 | 6/1979 | Colegrove | 166/270 |
| 4,440,228 | 4/1984 | Swanson | 166/274 |
| 4,482,015 | 11/1984 | Falk | 166/295 X |
| 4,489,783 | 12/1984 | Shu | 166/272 |
| 4,565,249 | 1/1986 | Pebdani et al. | 166/303 |
| 4,658,898 | 4/1987 | Paul et al. | 166/270 |
| 4,716,966 | 1/1988 | Shu | 166/295 |
| 4,799,548 | 1/1989 | Mumallah et al. | 166/288 |
| 4,804,043 | 2/1989 | Shu et al. | 166/261 X |

Primary Examiner—George A. Suchfield
Attorney, Agent, or Firm—Alexander J. McKillop; Charles J. Speciale; Charles A. Malone

[57] ABSTRACT

A process for closing pores in a bottom water zone where steam is directed so as to by-pass a zone of the formation containing hydrocarbonaceous fluids. Once a portion of the bottom water zone has reached a temperature in excess of about 300° F., steam entry is ceased. Afterwards, a temperature activated gellable composition is placed into the bottom water zone. When the composition reaches that portion of the bottom water zone where a temperature in excess of about 300° F. has been reached, the composition activates and forms a rigid gel. Thereafter, a steam flooding method is commenced. Steam is diverted from the bottom water zone and into an upper zone containing hydrocarbonaceous fluids.

17 Claims, 1 Drawing Sheet

METHOD FOR PREVENTING STEAM CHANNELLING INTO A NON-AQUIFER BOTTOM WATER ZONE

RELATED APPLICATIONS

This application is related to copending application Ser. No. 068,290, now U.S. Pat. No. 4,804,043 filed July 1, 1987 [and further identified as attorney's Docket No. 4352]. It is also related to Ser. No. 292,795 [which is further identified as attorney's Docket No. 5035]. Additionally, this application is related to Ser. No. 292,799 [which is further identified as attorney's Docket No. CR 87-P-70].

FIELD OF THE INVENTION

This invention relates to the use of a temperature activated gel that can be used to prevent steam channelling into a non-aquifer bottom water zone so that increased amounts of hydrocarbonaceous fluids can be obtained from an adjacent hydrocarbonaceous fluid bearing zone in a formation.

BACKGROUND OF THE INVENTION

In the recovery of oil from oil-containing formations, it is usually possible to recover only minor portions of the original oil-in-place by so-called primary recovery methods which utilize only natural forces. To increase the recovery of oil a variety of supplementary recovery techniques are employed. These techniques include waterflooding, miscible flooding, thermal recovery, and steam flooding.

A problem that arises in various flooding processes is that different strata or zones in the reservoir often possess different permeabilities. Thus, displacing fluids enter high permeability or "thief" zones in preference to zones of lower permeability. Significant quantities of oil may be left in zones of lower permeability. To circumvent this difficulty the technique of profile control is applied to plug the high permeability zones with polymeric gels and thus divert the displacing fluid into the low permeability, oil rich zones. Among the polymers examined for improving waterflood conformance are metal-crosslinked polysaccharides, metal-crosslinked polyacrylamides, and organic-crosslinked polyacrylamides. Another problem that arises when steam flooding a formation having a non-aquifer bottom water zone is that on occasion steam channels into the bottom water zone. This bottom water zone has relatively high permeability which allows high steam and water mobility therethrough. It is difficult to re-direct the steam into upper portions of the reservoir or formation since steam prefers the path of least resistance. The path of least resistance in this situation happens to be the bottom water zone. Another problem which arises is how to use a polymeric gel to close off an override area in a formation which has been swept by a steamflood.

Polymeric gels are disclosed in several U.S. patents. Among these is U.S. Pat. No. 4,157,322 which issued to Colegrove on June 5, 1979. This gel is formed from water, a polysaccharide polymer, an acid generating salt and a melamine resin. A polymeric gel is disclosed in U.S. Pat. No. 4,658,898 which issued to Paul and Strom on Apr. 21, 1987. This patent discloses an aqueous solution of heteropolysaccharide S-130 combined with inorganic cations which forms gels at elevated temperatures. U.S. Pat. No. 4,716,966, issued to Shu on Jan. 5, 1988, discloses a gel formed by amino resins such as melamine formaldehyde which modify biopolymers in combination with transitional metal ions. These patents are hereby incorporated by reference herein.

Basic to the problem of diverting displacing fluid with polymeric gels is the necessity of placing the polymer where it is needed, i.e. in the high permeability zone. This is not difficult if the gel is formed above ground. Xanthan biopolymers may be crosslinked with metal ions such as $Cr^{+3}$ above ground to give gels. These gels are shear thinning and can be injected into the formation where they then reheal. Since gel particles are being injected, they will of necessity go into high permeability zones. However, many other gel systems are formed in-situ. One system disclosed in U.S. Pat. No. 3,557,562 contains acrylamide monomer, methylene-bis-acrylamide as an organic crosslinker, and a free radical initiator. This system undergoes polymerization in the formation to give a polyacrylamide crosslinked with methylene-bis-acrylamide. However, the viscosity of the solution when injected is like that of water. Unless mechanical isolation is used, these solutions are quite capable of penetrating low permeability, oil bearing zones. Another form of in-situ gelation involves the injection of polyacrylamide containing chromium in the form of chromate. A reducing agent such as thiourea or sodium thiosulfate is also injected to reduce the chromate in-situ to $Cr^{+3}$, a species capable of cross-linking hydrolyzed polyacrylamide. Even though the polyacrylamide solution has a viscosity greater than water, it is not capable of showing the selectivity that a gel can. Thus, polyacrylamides crosslinked with chromium in-situ can also go into low permeability zones. It is not useful to crosslink polyacrylamides above ground and inject them as gels, because polyacrylamide gels undergo shear degradation.

Therefore, what is needed is a method for preventing steam channelling in a bottom water zone which will allow steam to be re-directed into an upper zone of a reservoir so that hydrocarbonaceous fluids can be removed therefrom.

SUMMARY

This invention is directed to a method for closing pores in a bottom water zone of a formation with a temperature activated gellable composition. The bottom water zone is heated by steam to a temperature which will activate said gellable composition. Heating of the bottom water zone occurs because steam channels down into the bottom water zone instead of entering an upper hydrocarbonaceous fluid bearing zone due to increased resistivity. The temperature activated gellable composition enters the formation including the bottom water zone. Upon entering the bottom water zone of the formation the temperature activated gellable composition forms a rigid gel due to the temperature there.

Thereafter, any ungelled composition is removed from zones in the formation where the temperature is not hot enough to cause compounds in said composition to react and form a rigid gel. Once the ungelled composition is removed, a steam flood enhanced oil recovery method is directed into the formation. Here, it is re-directed into the upper hydrocarbonaceous fluid bearing zone since the lower bottom water zone is closed by the rigid gel resultant from the temperature activated gelled composition. Hydrocarbonaceous fluids are subsequently removed from the upper zone of the formation.

Gellable aqueous compositions which can form a solid gel upon reaching a temperature above 300° F. are comprised of selected water dispersible polymers, phenolic compounds, and aldehyde producing compounds. Polymers which are utilized herein are selected from a member of the group consisting of polyvinyl alcohol, polyvinyl alcohol copolymers, polyacrylamide, polyvinyl amine, sulfonated polyvinyl alcohol, and poly (acrylamide-co-acrylamido-2-methylpropane sulfonate). Phenolic compounds which can be used include phenol, catechol, resorcinol, phloroglucinol, 4,4'-diphenol, 1,3-dihydroxynapthalene, and related similar compounds. Aldehyde producing compounds which can be utilized herein upon reaching a temperature above about 300° F. include trioxane and paraformaldehyde, tetraoxane.

It is therefore an object of this invention to provide for a temperature activated gellable composition which can be delivered into a heated bottom water zone having a temperature sufficient to activate said composition and selectively form a solid gel therein.

It is another object of this invention to provide for a temperature activated gellable composition which can be delivered into a formation's lower steam channelling zone having a temperature above about 300° F. and thereafter form a solid gel therein.

It is yet another object of this invention to provide for a composition which avoids forming a solid gel in an upper hydrocarbonaceous fluid bearing zone or a zone of a formation which is less than about 300° F.

It is another further object of this invention to provide for a composition that will minimize gel damage to an upper zone of lower permeability while closing pores in a higher permeability bottom water zone having a temperature above about 300° F.

It is still another object of this invention to inject a heat activated gellable composition into a producer well communicating with a bottom water zone and cause a solid gel to form in said zone so as to divert steam into an upper unswept formation zone.

DESCRIPTION OF THE PREFERRED EMBODIMENTS

Figure 1:
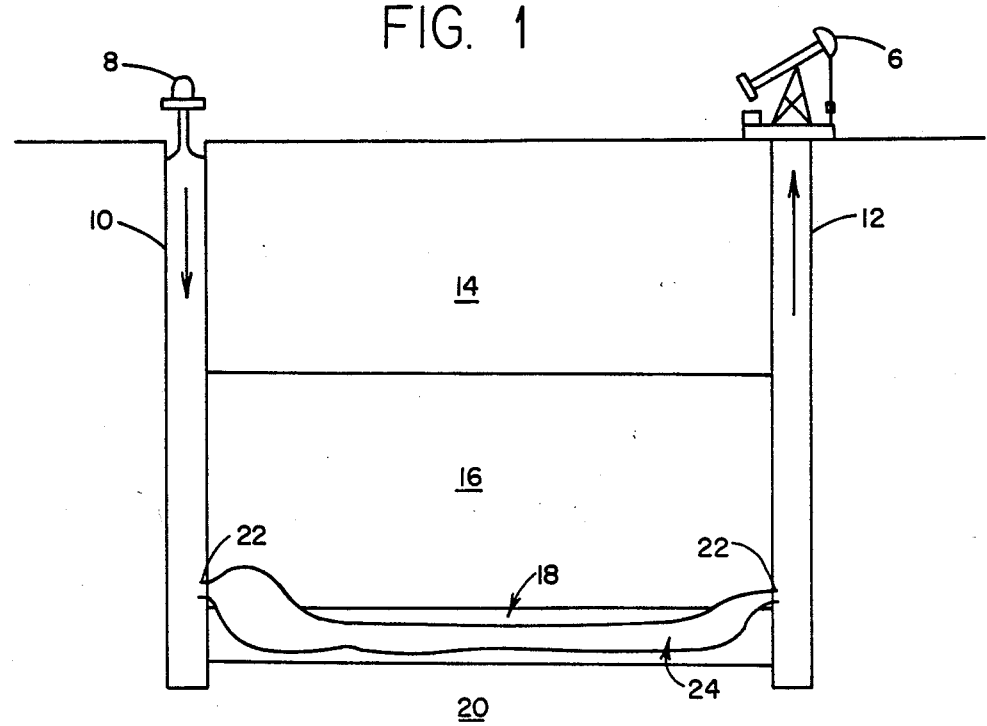
FIG. 1 is a diagrammatic plan view of a formation where steam has passed through a bottom water zone or area into a production well.

During the recovery of hydrocarbonaceous fluids via a steam flooding process, as is shown in FIG. 1, steam is injected into injector well 10 by steam injector 8. Steam is injected into a hydrocarbonaceous fluid containing zone 16 via perforations 22. After entering zone 16 steam encounters resistivity in zone 16 because the permeability therein is less than in bottom water zone 18. Steam then channels into bottom water zone 18 where the permeability is substantially greater than in zone 16. Bottom water zone 18 becomes a relatively high steam and water mobility zone because its permeability is substantially greater than that of zone 16. Due to this sequence of events, steam exits bottom water zone 18 into producer well 12 via perforations 22. Steam communication in zone 18 causes the creation of steam zone 24. Having been diverted into bottom water zone 18, steam is unable to remove hydrocarbonaceous fluids from zone 16 which lies below cap rock zone 14.

While steam is communicating between injector well 10 and producer well 12 bottom water zone becomes heated to a temperature in excess of 300° F. The temperature reached in either zone 16 or bottom water zone 18 will of course depend upon the steam injection rate, temperature, and pressure of the steam being injected as well as the distance the steam travels into the zones. The longer steam is injected into the formation, the hotter the temperature in the formation.

After a portion of bottom water zone 18 desired to be blocked has reached a temperature required to activate a temperature activated gel, steam injection is ceased. The temperature activated gellable composition which is preferred for use herein will form a rigid gel upon reaching a temperature of between about 350° F. and 450° F.

Figure 2:
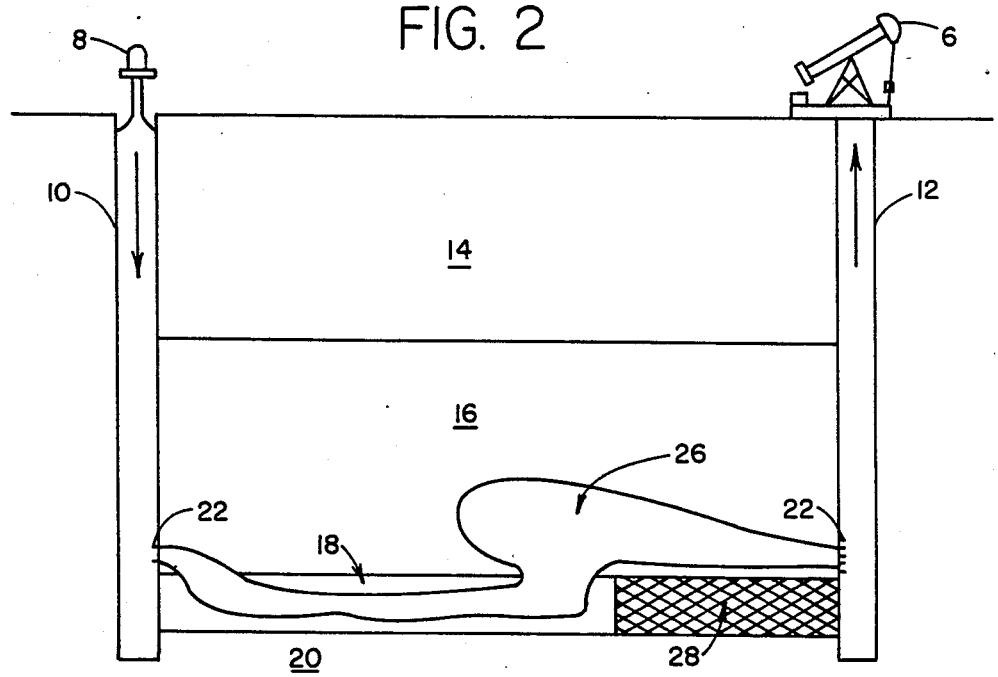
FIG. 2 is a diagrammatic plan view where the lower bottom water zone has been partially closed with a heat reactive gel while steam is passing through an upper hydrocarbonaceous fluid bearing zone or area.

After steam injection is terminated, the temperature activated gellable composition is injected via perforations 22 in injector well 10 into bottom water zone 18. This is depicted in FIG. 2. When the temperature activated gellable composition reaches a temperature of between about 350° C. to about 450° F. it forms a rigid gel 28. Once the rigid gel has formed, cold water is injected into injector well 10 where it is mixed with any ungelled composition in zones 16 and 18. After injecting water into these zones in an amount sufficient to keep the composition in an ungelled state which results from the water dilution, water injection is stopped. Thereafter, steam injection is again commenced into injector well 10 where it travels through bottom water zone 18 until rigid gel 28 is reached. Upon reaching rigid gel 28, steam is then re-directed from that portion of bottom water zone 18 into expanding steam zone 26 in zone 16. Leaving there, steam enters producer well 12 via perforations 22 carrying with it hydrocarbonaceous fluids. Steam, water, and hydrocarbonaceous fluids are produced to the surface from producer well 12 via pump 6.

Generally the solid gel will form at a temperature greater than about 300° F. in about from 1 to about 20 days. Although some of the aqueous gellable mixture may enter zone 16, it will not form a gel in that zone because the temperature is too low. Any gellable mixture which enters zone 16 can be removed therefrom by pumping a spacer volume of cold water therethrough so as to make the mixture ungellable. Alteratively, any ungelled materials can be pumped out or produced back to the surface if the producer well is treated.

If it is desired to block an additional area in zone 18, additional activated gellable composition can be injected and allowed to form a rigid gel. This can be repeated until zone 18 has been blocked to the extent desired.

Aqueous gellable heat activated compositions which can be utilized herein are comprised of a polymer, a phenolic compound, and an aldehyde. Polymers utilized herein are water dispersible polymers. The term "polymer" is employed generically to include both homopolymers and copolymers. The term "water-dispersible polymers" is used generically to include those polymers which are truly water-soluble and those polymers which are dispersible in water or in other aqueous medium to form stable colloidal suspensions which can be gelled. Also, the term "aqueous dispersion" is utilized generically to include both true solutions and stable colloidal suspensions of components of the composition of this invention which can be gelled as will be described herein. Water-dispersible polymers which are used herein are selected from a member of the group consisting of polyvinyl alcohol, polyacrylamide, sulfonated polyvinyl alcohol, and poly (acrylamide-co-acrylamido-2-methylpropane sulfonate). Polyvinyl alcohol (PVA) at various degrees of hydrolysis are useful. Other polymers containing OH, $NH_2$, $CONH_2$, and SH are also useful. Polyvinyl amine, and copolymers containing the previously mentioned functional groups are useful. Any of these water-dispersible polymers are placed into an aqueous mixture in amount of from about 0.5 to about 5.0 wt. %. The aqueous medium can comprise fresh water, brackish water, or sea water, and mixtures thereof. Polyacrylamide and poly(2-acrylamido-2- methylpropane sulfonate) are discussed in U.S. Pat. No. 4,440,228 which issued on Apr. 3, 1984 to Swanson. This patent is hereby incorporated herein in its entirety.

After placing the selected water-dispersible polymer into the aqueous medium, a phenolic compound is added to the mixture. Phenolic compounds which can be used herein include phenol, naphthol, catechol, resorcinol, phloroglucinol, 4,4'-diphenol, 1,3-dihydroxynaphthalene, and related similar compounds. The amount of phenolic compound utilized should be in excess of 0.5 wt. % or higher. The amount of phenolic compound used herein should be sufficient to impart the desired gellation effect within the desired time period.

Once the phenolic compound has been added, a water-dispersible aldehyde is mixed into the aqueous mixture. Under proper conditions of use, both aliphatic and aromatic monoaldehydes, and dialdehydes, can be used. The aliphatic monoaldehydes containing from 1 to about 10 carbon atoms per molecule are presently preferred. Representative examples of such aldehydes include formaldehyde, trioxane, tetraoxane, polyoxymethylene, and other polymeric aldehydes. Representative examples of dialdehydes include glyoxal, glutraldehyde, terephthaldehyde, and mixtures thereof. The term "water-dispersible" is employed generically to include both those aldehydes which are truly water-soluble and those aldehydes of limited water solubility but which are dispersible in water or other aqueous media so as to be effective gelling agents. The preferred aldehyde is trioxane.

Any suitable amount of trioxane and phenolic compounds can be utilized herein. In all instances, the amount of aldehyde and phenolic compound used should be small but in an amount sufficient to cause gellation of an aqueous dispersion of a polymer, the aldehyde, and the phenolic compound. As a general guide, the amount of aldehyde used in preparing the gel compositions herein will be in the range of from about 0.05 to about 5, preferably 1.0 to about 3.0 wt. % based on the total weight of the composition.

A preferred temperature activated gellable mixture comprises polyvinyl alcohol, phenol, and trioxane. The effect of temperature on said mixture is shown in Table 1. When exposed to a formation having a temperature of about 300° to about 350° F. or higher, a firm gel will form in about 1 day to about 15 days when 0.05 to about 0.5 wt. % of sodium hydroxide is utilized as is shown in Table 2. Polyvinyl alcohol is used in amounts of about 0.5 to about 5.0 wt. %. Phenol is used in about 0.5 to about 5.0 wt. % or higher. The phenol to trioxane ratio is about 1.5 to 0.5, preferably about 0.75. The polyvinyl alcohol/phenol weight ratio is from about 0.2 to about 2. Of course, a lower ratio is used when other higher molecular weight polymers are utilized. Polymer concentration is directly proportional to the gel strength. A rigid gel is formed which is proportional to the total materials content.

TABLE 1

| Temperature Sensitivity of PVA/Phenol/Trioxane* Gelation | | | | | |
| --- | --- | --- | --- | --- | --- |
| Temp, °F. | 200 | 300 | 350 | 400 | 450 |
| Gel Time, days | no gel | no gel | 1 | 1 | 1 |

*2.5% PVA, 4% phenol, 3% trioxane

TABLE 2

| Effect of NaOH Concentration on Gel* Time | | | | |
| --- | --- | --- | --- | --- |
| NaOH, % | 300° F. | 350° F. | 400° F. | 450° F. |
| 0.05 | No gel | 15 days | 8–9 days | 4 days |
| 0.1 | " | 15 days | 5–7 days | 2 days |
| 0.2 | " | 12 days | 2 days | 1 day |
| 0.3 | " | 9 days | 1 day | 1 day |
| 0.5 | " | 6 days | 1 day | 1 day |

*2.5% PVA, 4% phenol, 3% trioxane

Prior to injecting the aqueous temperature activated gellable mixture, the formation is heated as mentioned above during the steam flooding enhanced oil recovery process. A formation temperature of about 350° F. is preferred. The method of this invention can also be used when the area in or substantially near either the injection well or the production well has been heated to the desired temperature. This method is particularly beneficial when it is desired to close the heated area around a production well which has suffered a premature steam breakthrough. In this situation, steam injection is ceased and the temperature activated gellable mixture is injected into the production well for a time sufficient to enter the areas of the bottom water zone which comprise the premature breakthrough zone. Afterwards the gellable mixture in that zone is allowed to form a solid gel. Once the solid gel is formed, an enhanced oil recovery method in which a drive fluid is utilized can be injected either through the injection well or the production well to recover hydrocarbonaceous fluids from an upper less permeable zone of the formation.

As demonstrated, the novelty of this invention is that the crosslinking reaction is activated at elevated temperatures greater than about 350° F. The crosslinking reaction is not elevated at temperatures under 300° F. At high temperatures, trioxane, a cyclic dimer of formaldehyde decomposes to yield formaldehyde which in turn reacts with phenol to form phenolic resin, the gelant, in situ. Phenolic resin then gels the polymer.

Steamflood processes which can be utilized in this method described herein are detailed in U.S. Pat. Nos. 4,489,783 and 3,918,521 issued to Shu and Snavely, respectively. These patents are hereby incorporated by reference herein.

Cyclic carbon dioxide steam stimulation can be commenced after plugging bottom water zone 18 with the heat activated gellable composition. A suitable process is described in U.S. Pat. No. 4,565,249 which issued to Pebdani et al. This patent is hereby incorporated by reference in its entirety.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for closing pores in a bottom water zone of a formation comprising:
    (a) heating by a steam flooding enhanced oil recovery process the bottom water zone to a temperature sufficient to cause a temperature activated gellable mixture to form a solid gel;
    (b) terminating steam injection into the formation upon reaching a temperature sufficient in said zone to activate said mixture;
    (c) injecting into said formation the temperature activated gellable mixture that comprises water, sufficient amounts of a polymer selected from a member of the group consisting of polyvinyl alcohol, polyacrylamide, sulfonated polyvinyl alcohol and poly(acrylamide-co-acrylamido-2-methylpropane sulfonate) cross-linked in situ with a phenolic compound and an aldehyde producing compound which mixture enters said heated bottom water zone; and
    (d) activating said mixture by the temperature in the bottom water zone which temperature causes a solid gel to form and subsequently closes pores in said bottom water zone.

2. The method as recited in claim 1 where a spacer volume of cold water is pumped into the formation after step (d) which keeps any ungelled mixture from forming a solid gel.

3. The method as recited in claim 1 where a steam flooding enhanced oil recovery process is commenced after step (d) and steam is re-directed into an upper hydrocarbonaceous fluid bearing zone.

4. The method as recited in claim 1 where the gellable mixture comprises water, polyvinyl alcohol, phenol, and trioxane which forms a solid gel at a temperature of about 350° F. or greater.

5. The method as recited in claim 1 where the gellable mixture comprises water, polyvinyl alcohol, phenol, and trioxane where the polyvinyl alcohol to phenol ratio is about 0.2 to about 2.0, the phenol to trioxane ratio is about 1.5 to about 0.5, and a gel forms in from about 1 to about 15 days with the addition of about 0.10 to about 1.0 wt. % of sodium hydroxide.

6. The method as recited in claim 1 where in step (c) said aldehyde producing compound comprises trioxane, tetraoxane, and polyoxymethylene.

7. The method as recited in claim 1 where in step (c) said phenolic compound comprises phenol, naphthol, catechol, resorcinol, phloroglucinol, 4,4,-diphenol, and 1,3-dihydroxynaphthalene and the aldehyde producing compound comprises trioxane, tetraoxane, and polyoxymethylene.

8. A method for closing pores in a bottom water zone of a formation comprising:
    (a) heating the bottom water zone by steam flooding to a temperature greater than about 300° F. which temperature is sufficient to activate a gellable mixture and cause it to form a solid gel;
    (b) ceasing steam injection into the formation upon reaching said temperature in the bottom water zone;
    (c) injecting into the formation a temperature activated gellable aqueous mixture which contains sufficient amounts of a polymer selected from a member of the group consisting of polyvinyl alcohol, polyacrylamide, sulfonated polyvinyl alcohol, and poly (acrylamide-co-acrylamido-2-methylpropane sulfonate) cross-linked in situ with a phenolic compound and an aldehyde producing compound in an amount sufficient to form a solid gel;
    (d) activating said mixture upon reaching a temperature of about 300° F. so as to form a solid gel and close pores in said bottom water zone; and
    (e) removing any ungelled mixture from the formation.

9. The method as recited in claim 8 where a spacer volume of cold water is pumped into the formation after step (d) which keeps any ungelled mixture from forming a solid gel.

10. The method as recited in claim 8 where a steam flooding enhanced oil recovery process is commenced after step (e) and steam is re-directed into an upper hydrocarbonaceous fluid bearing zone.

11. The method as recited in claim 8 where the polyvinyl alcohol to phenol ratio is about 0.2 to about 2.0, the phenol to trioxane ratio is about 1.5 to about 0.5, and a gel forms in from about 1 to about 15 days when sodium hydroxide in about 0.10 to about 1.0 wt. % is added to the gellable mixture.

12. The method as recited in claim 8 where said polymer is contained in the mixture in from about 0.5 to about 5.0 wt. %.

13. The method as recited in claim 8 where said aldehyde is a member selected from the group consisting of aldehydes having from 1 to about 10 carbon atoms per molecule, such as trioxane and tetraoxane which aldehyde is contained in said gellable mixture in about 0.05 to about 5.0 wt. %.

14. The method as recited in claim 8 where the phenolic compound is contained in said gellable mixture in about 0.005 to about 2 wt. % and is a member selected from the group consisting of phenol, naphthol, catechol, resorcinol, phloroglucinol, pyrogallol, 4,4'-diphenol, and 1,3-dihydroxynaphthalene.

15. A method for closing pores in a bottom water zone of a formation which has a temperature greater than about 300° F. comprising:
    (a) conducting a steam flooding enhanced oil recovery process in a formation's bottom water zone until steam breakthrough occurs thereby heating said zone to a temperature greater than about 300° F.;
    (b) ceasing injection of steam into the formation upon reaching said temperature in the bottom water zone;
    (c) injecting a temperature activated gellable mixture into the formation which mixture comprises water, polyvinyl alcohol, phenol and trioxane in an amount sufficient to form a phenolic resin in situ and cross-link with said alcohol at a temperature greater than about 300° F.;
    (d) allowing said mixture to remain in the formation for a time sufficient to form a solid gel in said bottom water zone of said formation having a temperature greater than about 300° F.;
    (e) injecting cold water into the formation in an amount sufficient to prevent any ungelled mixture from forming a solid gel; and
    (f) injecting thereafter steam into the formation which enters an upper zone of the formation where the temperature was not previously heated above about 300° F. and removing hydrocarbonaceous fluids therefrom.

16. The method as recited in claim 15 where steam is injected into the formation via an injection well and hydrocarbonaceous fluids are produced therefrom by a production well.

17. The method as recited in claim 15 where the polyvinyl alcohol to phenol ratio is about 0.2 to about 2.0, the phenol to trioxane ratio is about 1.5 to about 0.5, and a gel forms in from about 1 to about 15 days with the addition of about 0.10 to about 1.0 wt. % of sodium hydroxide.

* * * * *